United States Patent [19]
Weinberg et al.

[11] Patent Number: 6,020,845
[45] Date of Patent: Feb. 1, 2000

[54] SATELLITE FOR INCREASING THE UTILITY OF SATELLITE COMMUNICATION SYSTEMS

[75] Inventors: Aaron Weinberg, Potomac, Md.; Kenneth Cunningham, Sterling, Va.

[73] Assignee: Stanford Telecommunications, Inc., Reston, Va.

[21] Appl. No.: 08/736,110

[22] Filed: Oct. 24, 1996

Related U.S. Application Data

[63] Continuation-in-part of application No. 08/154,410, Nov. 19, 1993, Pat. No. 5,572,216.

[51] Int. Cl.$^7$ ........................................................ G01S 5/02
[52] U.S. Cl. .......................... 342/354; 342/357; 455/12.1; 455/13.1; 701/213
[58] Field of Search ...................................... 342/352, 357, 342/359, 354; 455/12.1, 13.1; 701/213

[56] References Cited

U.S. PATENT DOCUMENTS

| | | | |
|---|---|---|---|
| 3,982,075 | 9/1976 | Jefferis et al. | 175/153 S |
| 4,375,697 | 3/1983 | Visher . | |
| 4,455,651 | 6/1984 | Baran | 370/104 |
| 4,743,909 | 5/1988 | Nakamura et al. . | |
| 5,041,833 | 8/1991 | Weinberg . | |
| 5,303,393 | 4/1994 | Noreen et al. | 455/3.2 |
| 5,379,445 | 1/1995 | Arnstein et al. | 455/13.4 |
| 5,402,424 | 3/1995 | Kou | 370/95.3 |
| 5,404,375 | 4/1995 | Kroeger et al. | 375/200 |
| 5,430,729 | 7/1995 | Rahnema . | |
| 5,430,738 | 7/1995 | Tsuda | 371/37.1 |
| 5,463,656 | 10/1995 | Polivka et al. | 375/200 |
| 5,572,216 | 11/1996 | Weinberg et al. | 342/357 |

OTHER PUBLICATIONS

Bolton et al., Spacelab—Its Command and Data Management Role in the Space Transportation System, IEEE Transactions on Communications, vol. COM–26, No. 11, Nov. 1978, pp. 1568–1583, see entire document.*

*Primary Examiner*—Thomas Tarcza
*Assistant Examiner*—Dao L. Phan
*Attorney, Agent, or Firm*—Jim Zegeer, Esq.

[57] ABSTRACT

An existing TDRSS satellite communication system is incorporated, together with low-power ground-based remote transceivers of special design, and additional beamforming and steering elements at the ground terminals, to make possible digital communication between low power field transceivers and satellite ground terminals. The satellite communication system transmits to its ground terminals a composite signal, comprising amplified, phase-coherent signals received by an array of broad-coverage antennas on the satellite. The field transceiver transmits a pseudonoise coded signal spread across all or a portion of the satellite's receive bandwidth. At the ground terminals, the downlinked composite signal is processed by a beamformer to define a narrow, high-gain beam between the satellite and low-power transceiver. Signal processing gain and beamformer gain in combination serve to elevate the received, demodulated signals well above the noise level at the receiver. Through this invention, a large multiplicity of non-interfering reverse-link (remote-to-central) communication channels may be supported by a host satellite communication system of the nature described. By the introduction of forward link signal channels into the satellite ground terminal, and scheduling of forward link transmissions to the set of low-power remote transceivers along with normal transmit activities, highly useful two-way communication can be extended to a class of users not initially served by the satellite communication system.

4 Claims, 7 Drawing Sheets

SATELLITE FOR INCREASING THE UTILITY OF SATELLITE COMMUNICATION SYSTEMS

REFERENCE TO RELATED APPLICATIONS

This application is a continuation-in-part of application Ser. No. 08/154,410 filed Nov. 19, 1993 now U.S. Pat. No. 5,572,216 for SYSTEM FOR INCREASING THE UTILITY OF SATELLITE COMMUNICATION SYSTEMS.

BACKGROUND OF THE INVENTION

There is an immediate and growing need for satellite-based, global communications on-demand, between a hand-held user transceiver and a central gateway or hub. This need, which applies to both the U.S. government and non-government sectors, includes 24 hour-a-day random access communications support for emergency indication, small sensors, law enforcement, and many other "remote" user scenarios. The emphasis is on the ability of the satellite system to accommodate transmissions from hand-held units at anytime and anywhere; communications back to the user must also be supportable, but typically in reaction to a transmission from the user. Such hand-held, random-access communication scenarios cannot be accommodated by existing commercial satellite communication systems, but, according to this invention, can be readily supported by a novel and unique utilization of NASA's Tracking and Data Relay Satellite System (TDRSS) or a similar satellite system. The associated TDRSS support, coupled with the transceiver technology and implementation, are the subjects of this invention.

Most communication satellites operate at geosynchronous altitude, an altitude of about 22,000 miles, at which point the earth's disk appears approximately 20 degrees across. These satellite communication systems have traditionally utilized broad-coverage antennas to concurrently receive signals from, and transmit signals to, regional or near-hemisphere areas, while remaining over a fixed spot on the earth's equator. The broad antenna beam, at typical frequencies (e.g., microwave), corresponds to a small-area transmit-receive antenna. This, in turn, limits the electromagnetic power the antenna can intercept. The result is that, for acceptable communication quality, users on the ground[1] must have relatively large antennas and/or transmit many watts of power; this, in turn, typically leads to transceivers that cannot be hand-held and, further, precludes efficient battery-powered operation.

[1]"Ground" is used generically and refers equally to land, sea and air users.

Typical satellite transponders (that is, the on-board equipment for relaying signals within a given frequency bandwidth) are in essence amplifier-frequency-shifters which can accept signals from any user-transmitter on the ground operating within the band covered, amplify those signals, shift their frequency and retransmit them through another antenna to a central gateway. Since the signals are not demodulated or signal-processed on-board the satellite, there is no processing gain to compensate for low signal power.

Special purpose communication satellites (e.g., for the Department of Defense) have been built for a variety of purposes. With a larger antenna on the satellite, it is possible to communicate with a user on the ground having a correspondingly smaller antenna and/or transmitter power. In this case, however, the beamwidth of the satellite's antenna is reduced, thereby requiring the location of the ground user to be known, and the satellite's antenna tracked to that location. Were the antenna mechanically tracked by rotating itself or the entire satellite, that would use propellant at an unacceptable rate; what's more, it could serve concurrently only users in a small area of the earth. Electronic antenna steering provides a highly attractive alternative that eliminates the disadvantages of mechanical steering while simultaneously providing the ability to focus on (or null) many regions concurrently with high (or low, for nulling) gain; electronic steering can also be accomplished much more rapidly than mechanical steering, again without any incurred mechanical satellite motion. Electronic steering is more expensive than traditional non-steerable antennas, and have heretofore appeared mainly on military satellites. Furthermore, even on such military satellites, the number of simultaneous receive beams that can be formed, and their operational flexibility, has been limited by the specific on-board beamforming capability employed. In this regard, the electronic beamforming capability used by the TDRSS is especially unique.

To satisfy its needs for global communications with low earth-orbiting spacecraft, NASA has developed the Tracking and Data Relay Satellite Systems (TDRSS), which includes geosynchronous satellites that are able to electronically steer an on-board phased-array antenna. This phased array views the entire earth's disk, but can form many simultaneous beams to support reception of many independent user transmissions; each such beam has a beamwidth considerably narrower than the earth's disk and thus also provides considerably higher gain than an earth coverage beam. Furthermore, this same phased-array can form a single narrow beam at a time to provide high power transmissions back to the user; this beam can be independent of, or directly related to, any of the many simultaneous receive beams. As such, both the receive (inbound or return link) and transmit (outbound or forward link) beams are sufficiently powerful to accommodate low-power, hand-held user transceivers; not only is this operationally attractive to the user but it also provides the added benefit of extended battery lifetime and reduced exposure to RF emissions.

Electronic beam steering requires that signals from a number of separate antenna elements, most commonly arranged in a planar area, be phase-shifted by amounts depending on the distance of the element from the center of the array and the direction in which the beam is to form. Whether the application is radar or communications, such antennas typically have their beamforming accomplished at the antenna. In this regard the TDRSS is unique, in that the inbound (i.e., return link) beamforming is performed on the ground. Specifically, the TDRSS transmits the signal, received by each on-board antenna element, separately to the ground station in a composite, frequency-multiplexed signal. Since the coverage of each element of the TDRSS is more than the angle of the earth's disk, the combination of signals sent to the ground can be combined on the ground to "form" a much narrower beam and to direct it, free of any mechanical inertia. This has several advantages relative to conventional approaches of beamforming at the antenna. First, a beamformer on the ground can be replaced if a failure occurs. Second, the number of independent beamformers can be much greater on the ground than can be possibly placed on-board a satellite. Third, the number of independent beamformers can be expanded and independently allocated to independent users, if needed, after the satellite is in orbit, and one or more receivers can be attached to each beamformer. Finally, the beamforming algorithms can evolve and improve with technology, if the beamforming is accomplished on the ground and can include split beams, nulling, and other forms of enhanced antenna pointing. Clearly, all of these advantages of ground-based beamforming yield a greatly increased satellite "return on investment".

Many global voice and data communication needs, both government and non-government, remain unmet through application of conventional communication satellites. More particularly, few (if any) satellite sensor or communication systems can communicate flexibly (e.g., demand or random access) and successfully with small, low-powered, handheld, low-data-rate ground-based user transceivers, or with remote instruments or controllers not equipped with large antennas or, equivalently, with high output power.

In addition to its services using electronically steered antennae, TDRSS also provides additional services via mechanically steered antennae. These single access (SA) services, at S, Ku and future Ka band, provide links with attractive bandwidth and link closure properties. Use of these services require scheduling; however, normal mission users do not require all of the schedulable service and spare satellites on orbit have no scheduled use. As such, there is a strong potential to use excess capacity within the SA services to also accommodate new ground users. For example, field users and/or users on the ground terminal side could store information over, for example, a period of hours. At a scheduled time, when no normal users required services, all or part of the stored information could be forwarded (i.e. transmitted) through TDRSS via one of the available services. Hence, this store-and-forward technique could be used to pass data to/from the field during intervals for which TDRSS had no other service requirement. As another example, since each TDRSS single access antennae is multi-band (S, Ku now; S, Ku, Ka in the future), only one frequency is typically used at a time. As such, if an independent user is within the beamwidth of an already scheduled single-access service, the independent user can take advantage of the "free" frequency to obtain single access service without the need for separately scheduled single access time.

Given the wide range of services and service types, there are numerous potential ground-based uses of TDRSS, even outside the area of hand-held transceivers, which are worthy of consideration. For example:

1. The ability to support high bandwidth broadcast and low rate request channels in a single satellite makes TDRSS a candidate for asymmetric broadcast services (e.g., the Global Broadcast System) for providing wireless Internet access, etc.
2. Packet data transfer via TDRSS, with short (e.g. <1 second) data packets, is possible using modified receiver technology to achieve rapid signal acquisition. Current TDRSS operations provide continuous service over contact intervals which may range from seconds to minutes in duration.
3. Field equipment may be tailored to mesh with services. For instance, low/high gain antennae, wide/narrow beam width antennae, low/high power amplifier, etc. can be employed to satisfy specific ground applications.
4. TDRSS is a "bent pipe" and data flow through it has no formal requirements in terms of content, security/encryption, coding, etc. In essence, all data may be passed over TDRSS given the RF signal characteristics are acceptable.

The object of this invention is to provide an improved global satellite communication system that uniquely applies the TDRSS without impact to its prime mission of supporting low-earth-orbiting science spacecraft; or another suitably implemented satellite system. This invention encompasses both the satellite system concept including the ground terminal, and the ground-based transceiver design and implementation required for successful system operation.

DESCRIPTION OF THE DRAWINGS:

The above and other objects, advantages and features of the invention will become more apparent when considered with the following specification and accompanying drawings wherein.

DETAILED DESCRIPTION OF THE INVENTION:

The heart of this invention is the employment of the existing TDRSS system (see FIG. 1), or others similar to it, to carry on communication between small, low-power field stations and a ground terminal suitable for receiving the composite downlink signal and/or the SA downlink signal transmitted from a TDRSS satellite. The elements shown as "TDRSS Ground Terminal" (GT) in FIG. 1 could be either new ground stations receiving the TDRSS satellite signal and providing receive service for low-power field stations, or existing TDRSS ground terminals supplying their composite downlink signals to beam former and receiver circuits (FIGS. 2 and 3) supporting each concurrent added field channel. In FIG. 2, for simplicity, only the two frontside constellation nodes 174'W and 41'W are shown.

Figure 1:
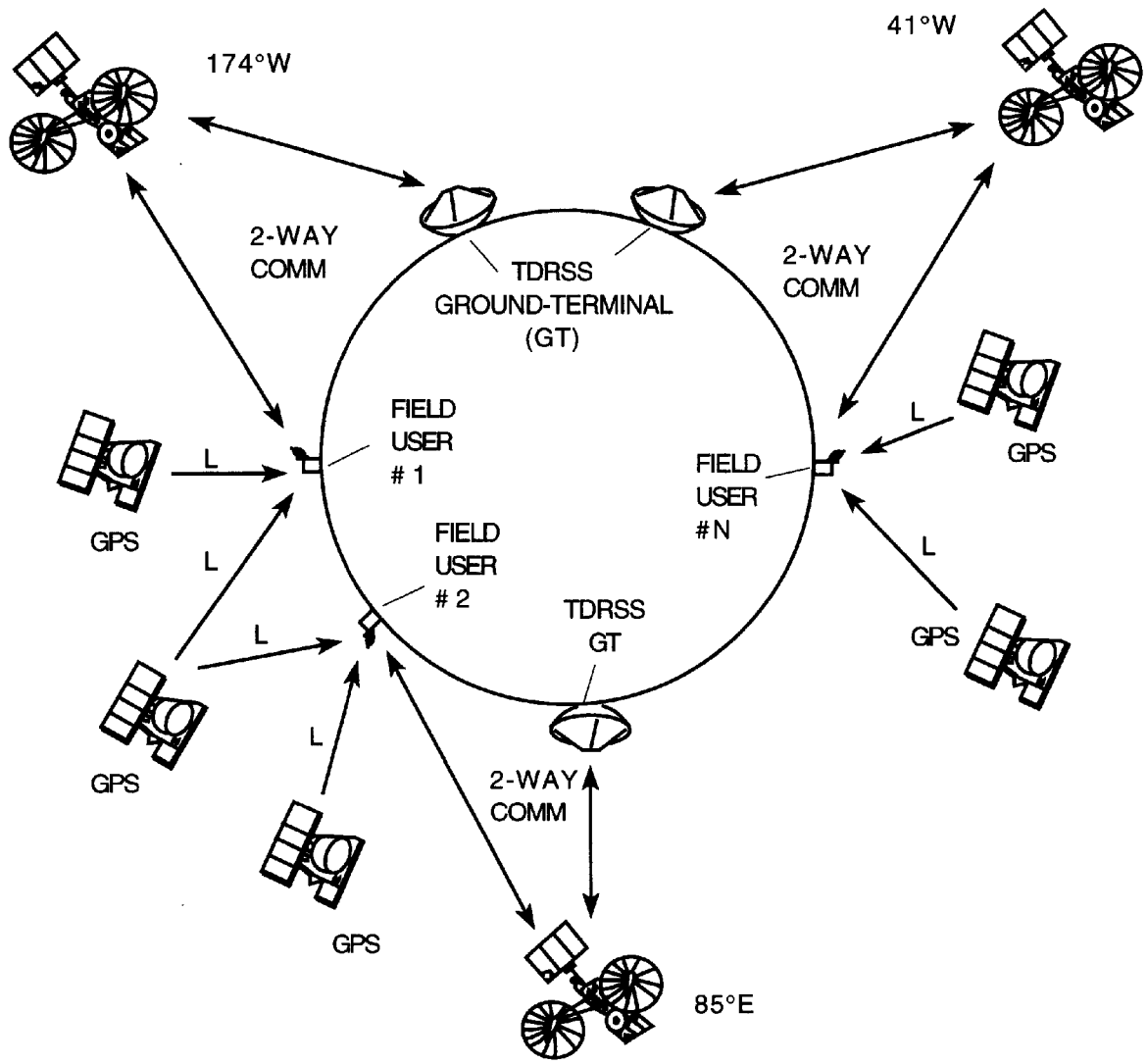
FIG. 1 is a diagrammatic overview of a satellite communication system incorporating the invention.
Figure 2:
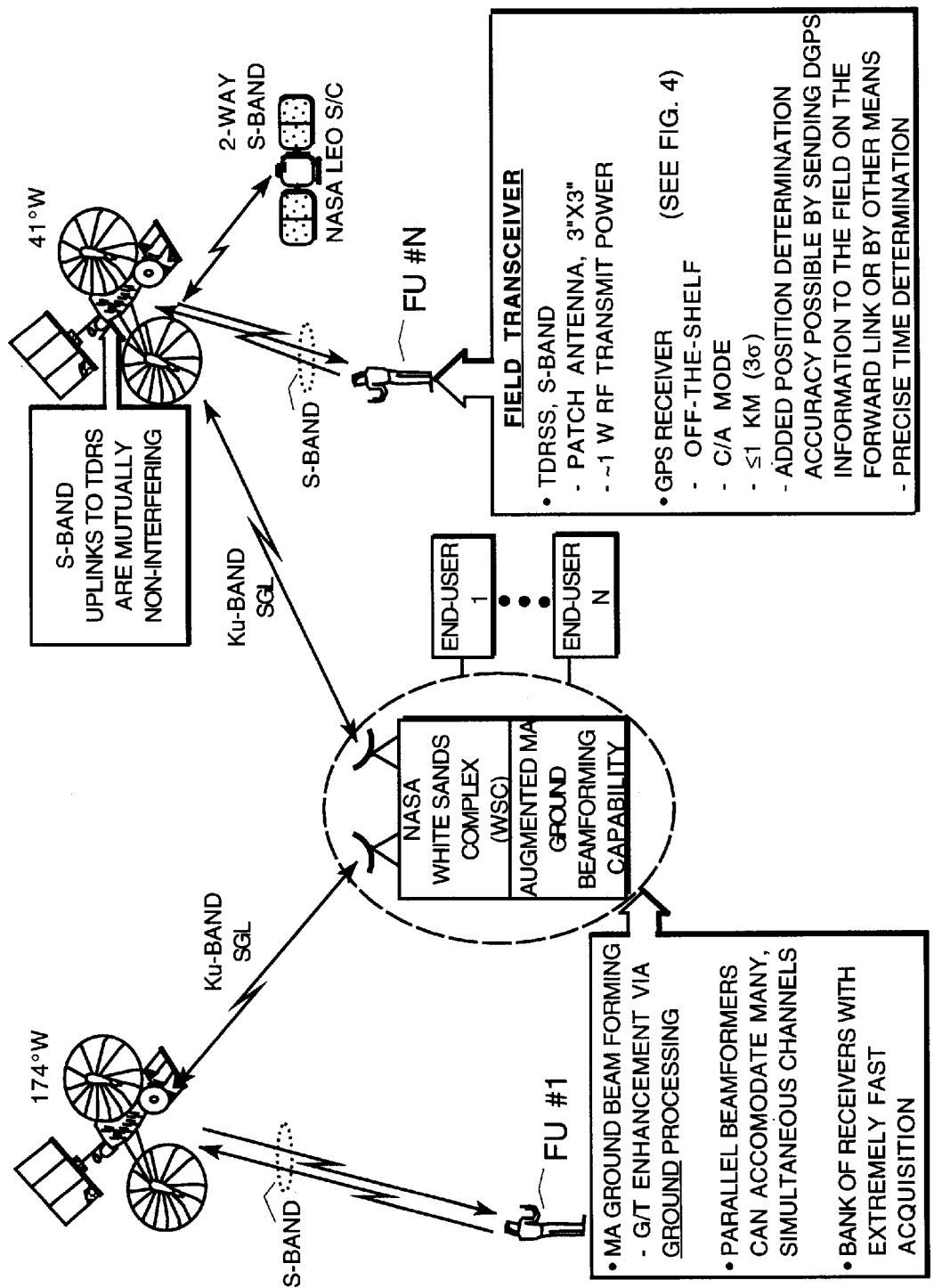
FIG. 2 is a more detailed diagrammatic view with a block showing key system characteristics.

The system of FIG. 1 provides:

1) Global coverage with inclusion of backside node;

2) TDRSS provides desired support with no satellite modifications;

3) Non-NASA traffic operates CDMA (or other non-interfering waveform) via TDRSS within normally used spectrum without interference (i.e., no dedicated or new spectrum for MA and some SA service);

4) Non-NASA user has access to multiple access (MA) return link (i.e., inbound from field-to-TSRSS) at any time, anywhere without scheduling;

5) Multiple Access (MA) forward link (i.e. outbound from TDRSS-to-field) and single access (SA) forward/return links involve coordination with NASA.

Figure 3:
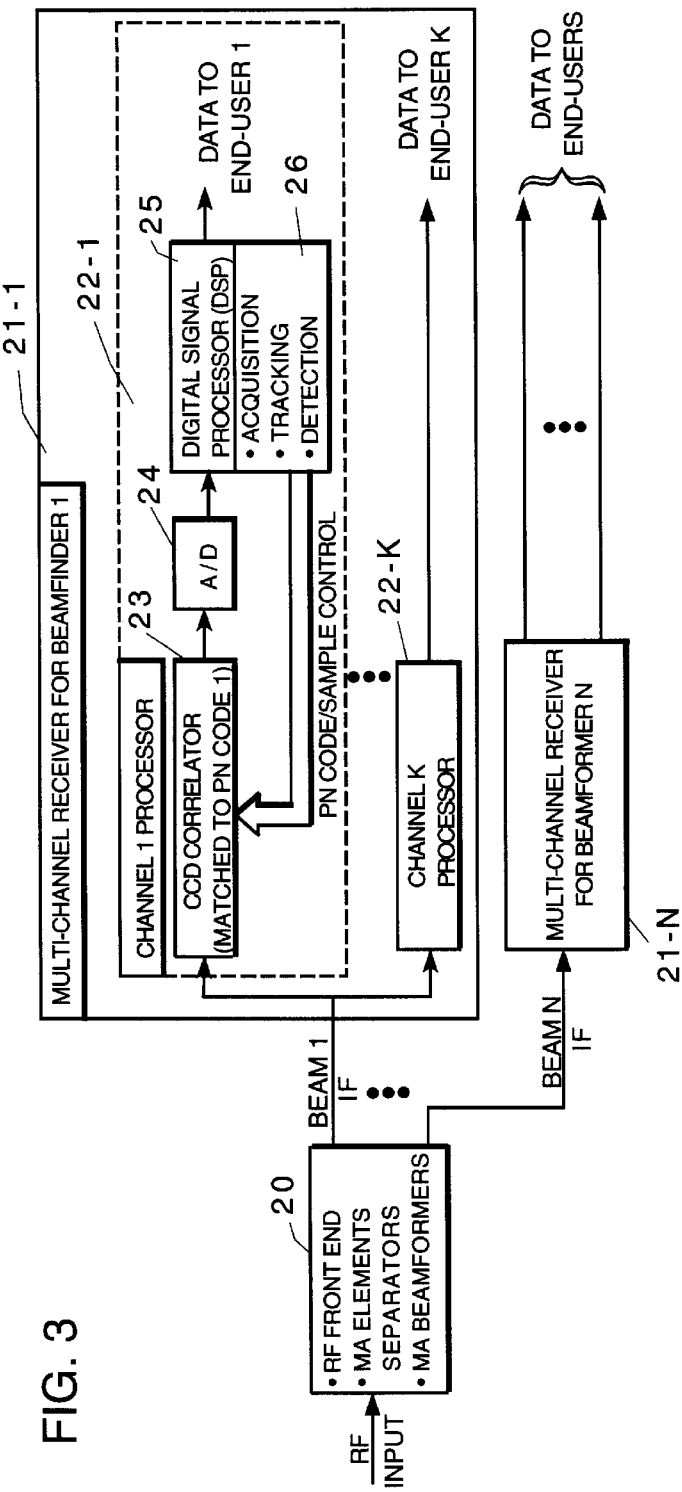
FIG. 3 is a block diagram of the multiple access (MA) beam forming multi-channel receiver configurations incorporating the invention.

In the block diagram of FIG. 3, RF frontend, multiple access elements separators and beamformers are contained in block 20 with the IF output of each beam, Beam 1, Beam 2 . . . Beam N being supplied to their respective multi-channel receiver for beamformers 21-1, 21-2 . . . 21-N, each of which has its end user channel processors 22-1, 22-2 . . . 22-K and each of which has a CCD correlator 23, which may be of the type shown in Weinberg et al. U.S. Pat. No. 5,126,682, the output of which is supplied to A/D converter 24 which, in turn, supplies its digital output to digital signal processor 25 and thence to the user. Processor 25 provides a PN code/sample control feedback loop 26 to correlator 23. Note that the existing ground terminal receiver equipment differs from this embodiment but is also applicable as are other receiver types.

A general block diagram of one embodiment of the low-power, hand-held field transceiver described above is shown in FIG. 4. Preferably, it will be battery powered and, in one embodiment, limited to communication at data rates of, say, 2400 bits per second or less, using 1–2 watts of transmitted RF power. This is sufficient to transmit coded voice, and generally speaking, more than sufficient to transmit computer generated signals or output from monitoring or alerting devices.

A small S-band patch antenna 30 is connected to diplexer 31 which supplies signals to the TDRSS forward link receiver 32, and receives signals for transmission from TDRSS return link transmitter circuit 33, both receiver 32 and transmitter 33 are managed by digital data processor 34. Most of the transceiver can be implemented in a single, all digital application specific integrated circuit. The transceiver can have separate transmit and receive antennas, in which case, diplexer 31 is not required. The antenna(e) for the receiver and transmitter can be selected to provide desired gain and pattern characteristics. Higher (or lower) data rates may be accommodated by proper selection of the antennae), power amplifier, and low noise amplification. A miniature (e.g. 5-channel) GPS receiver 36 coupled to a an L-band antenna 37 supplies GPS position information to the user. It will be appreciated that GPS Message Data (ephemeris, almanac, etc.) can be supplied via receiver channel 32 to aid in acquisition of the GPS satellite signals.

Figure 4:
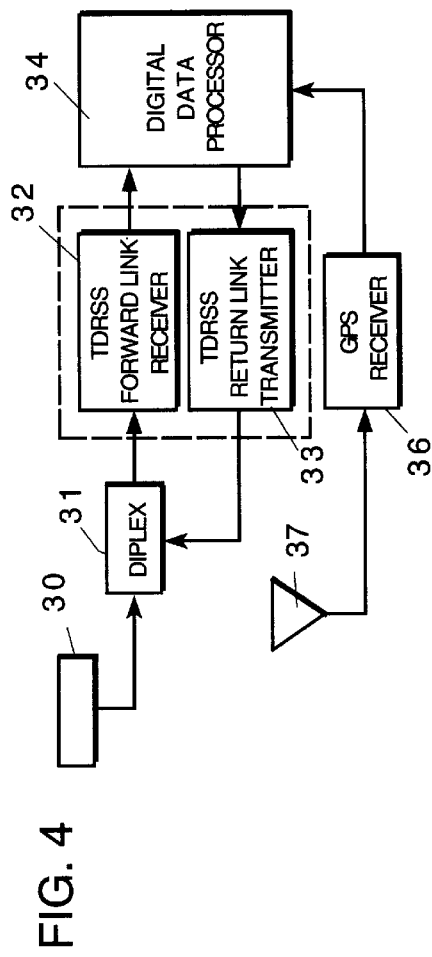
FIG. 4 is a generalized block diagram of a transceiver incorporating the invention.

In the battery powered transceiver depicted in FIG. 4, in the preferred embodiment, the transmitter 33 and receiver 32, operate non-coherently with one another, that is, without the requirement that transmitted and received signals bear a fixed electrical frequency and phase relationship associated with the TDRSS coherent turn-around mode. This feature arises from the desire to keep the transceiver simple and robust and of low power consumption. It places the onus for frequency tracking on the ground terminal beamformer, receiver and transmitter. However, since this particular low-power transceiver is intended for operation on land, sea, or air rather than space, the added tracking effort associated with large doppler shifts is not imposed on the ground terminal equipment. The embodiment shown in FIG. 4 incorporates a GPS receiver 36 which accomplishes position location, both for its user and for use by the TDRSS equipment that is assigned to it so that pointing/nulling accuracy may be enhanced. Moreover, the position location and other data can be caused to be transmitted automatically or by a triggering signal received by the transceiver.

Figure 5:
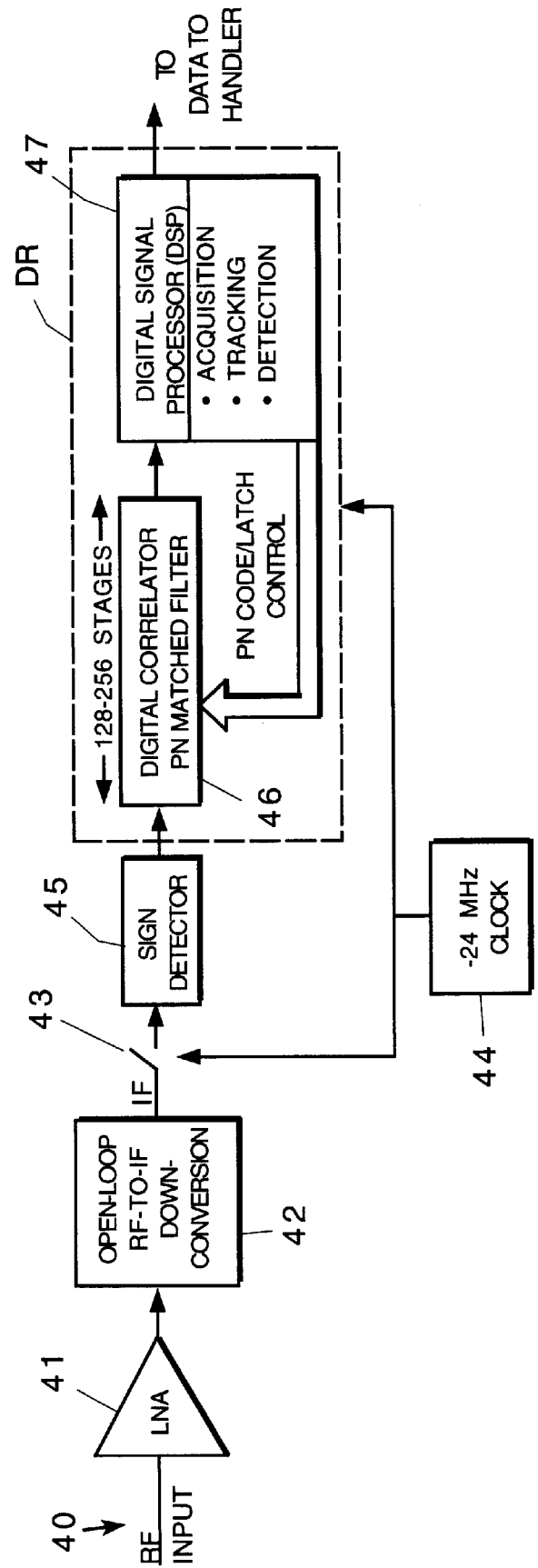
FIG. 5 is a more detailed block diagram of a compact/low power TDRSS forward link receiver incorporating the invention.

FIG. 5 is a more detailed embodiment of a compact low power TDRSS forward link receiver wherein the RF input 40 is amplified by a low noise amplifier 41, and the output down-converted by open loop RF to IF down-converter 42. The output is sampled at a 24 mHz rate by sampler 43 driven by clock 44. Sampled IF signals are sign detected in detector 45 and supplied to a digital correlator (pseudonoise matched filter) 46 (which is, for instance, a 128-256 stage correlator). Digital signal processor 47 receives the correlated signals from correlator 46 and forwards the signal to the data end user and also provides a PN code/latch control signal to correlator 46. The components in the dashed rectangle DR can be implemented by specific circuits or by application specific integrated circuit (ASIC) chips. The receiver design concept is shown in FIG. 5, and reflects the following:

a. PN code matched filter (PNMF) correlator for rapid PN acquisition.

b. IF sampled operation of the PNMF to simultaneously permit PN despreading and demodulation to baseband, while also leading to a reduction in the required number of components.

c. Open-loop downconversion to IF, and open-loop sampling at the PNMF input, to enable simplified frequency synthesis and reduced power consumption.

d. All acquisition and tracking processing, following the PNMF, via a combination of ASIC(s) and a low complexity microprocessor.

e. A nominal number of programmable, low data rate settings (e.g., 600 bps. 1.2 kbps, and 2.4 kbps), that are amenable to low complexity processing.

f. Preferably, power consumption is kept below 3 watts. Alterations to the FIG. 5 embodiment can be made to accommodate other spread and non-spread waveform types which are deemed acceptable for use on TDRSS.

Figure 6:
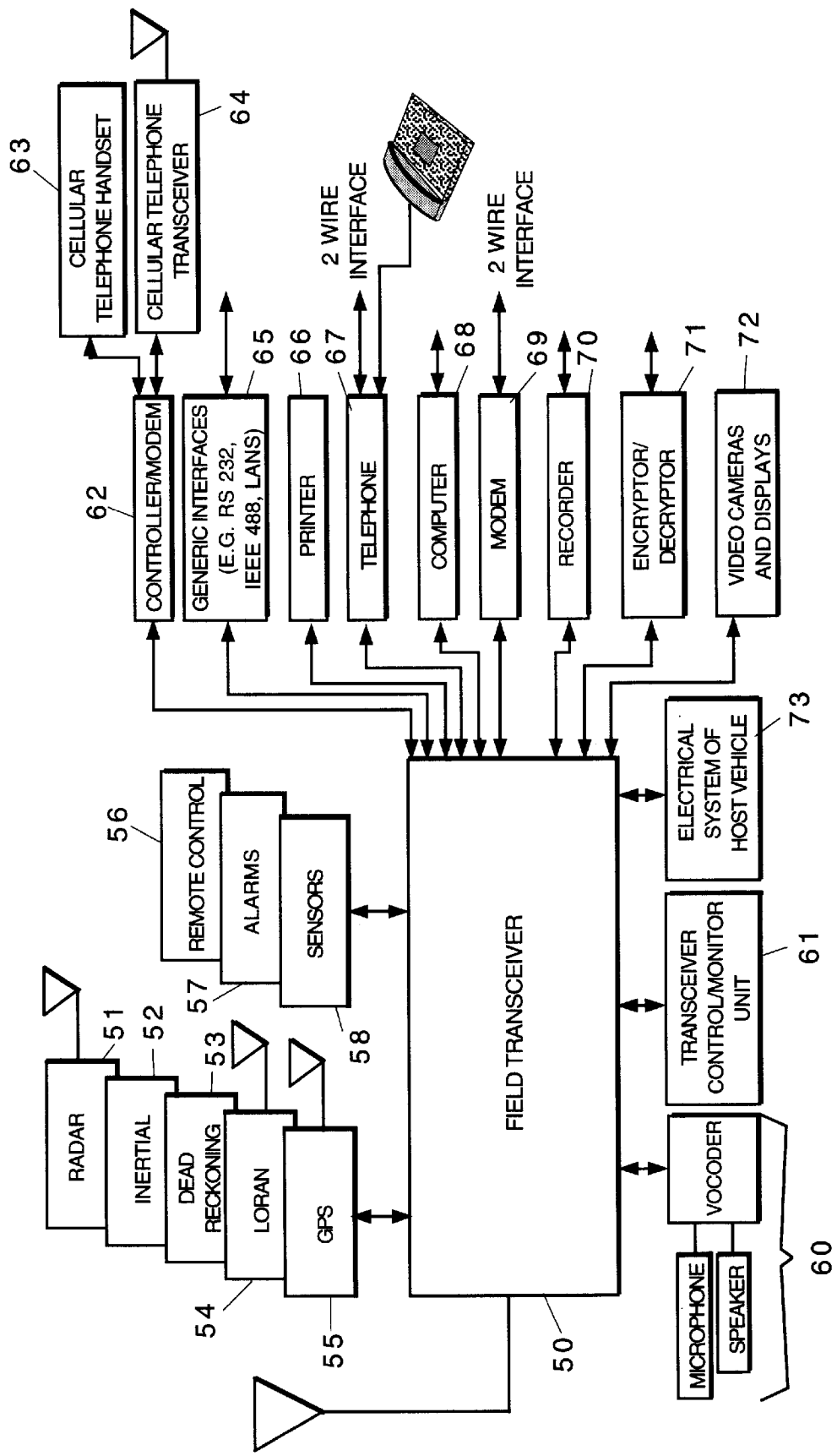
FIG. 6 is a block diagram of a remote transceiver incorporating the invention and illustrating available expansion options.

The robust nature of this system facilitates its use in a wide range of applications. FIG. 6 illustrates some of the accessories that may be interfaced with the field transceiver. Under this approach a common field transceiver 50 (or class of such transceivers) can be developed to satisfy numerous types of applications. It is also possible to integrate the accessories within the transceiver to satisfy special applications that require size, weight and cost reduction.

As illustrated, position systems, radar 51, inertial guidance unit 52, dead reckoning 53, loran 54, and GPS 55 can have their information used by the transceiver application and/or communicated to points remote from the field transceiver. Remote control element 56, alarm 57 and other sensors 58 can be coupled to the transceiver 50 for use by the transceiver application and/or transmission of data sensed therein to a remote location. Voice channel 60 for voice communication, through the transceiver, with a remote location transceiver control monitor unit 61 for use by the transceiver application and/or transceiver operation and status. The transceiver can also be coupled to a cellular network via control modem 62, cellular phone handset 63 and transceiver 64. Various computer-type interfaces 65 can be coupled to the transceiver 50 as well as a printer 66. Conventional Telco circuits 67, computer 68, modem 69, recorder 70, encryption/decryption device 71, and video display and cameras 72 may be incorporated in the system. If vehicle mounted the transceiver 50 can be powered by electrical power 73 from the host vehicle. Other power sources are also possible.

Figure 7:
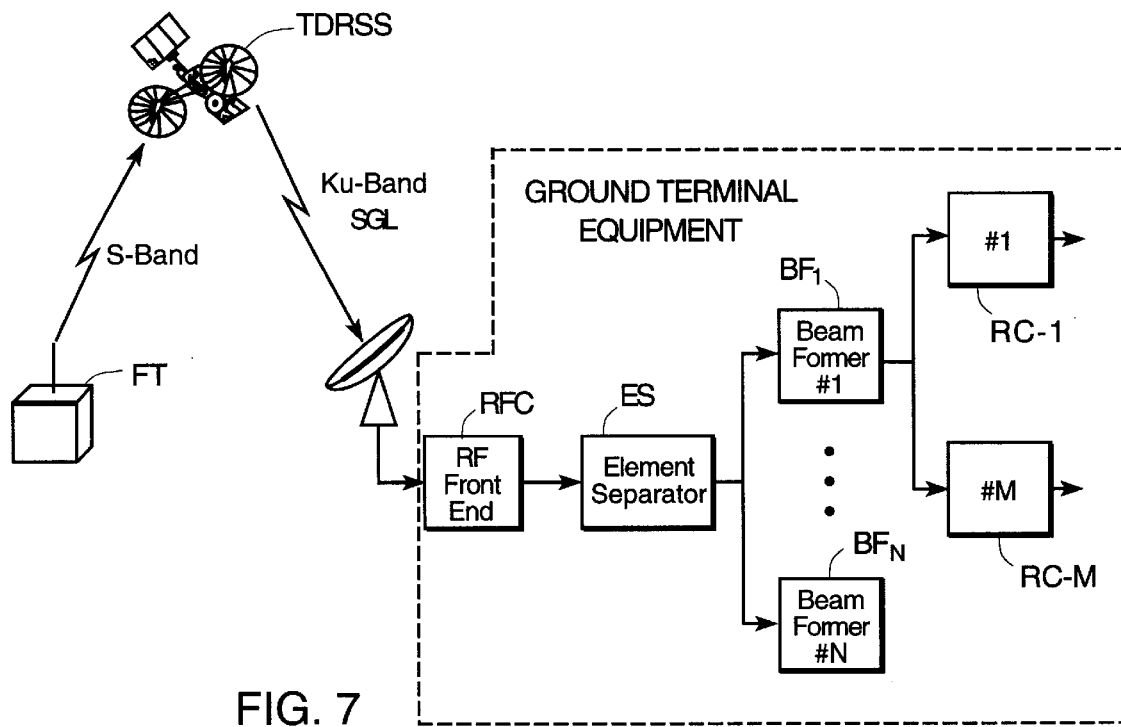
FIG. 7 is a block diagram of the S-band MA return link.

FIG. 7 is a block diagram of an S-band return link wherein a field transmitter FT transmits its signal on the S-band which is frequency shifted by TDRSS satellite to a Ku-band signal and transmitted to a ground terminal for processing via RF front end RFE, an element separator ES and the elements coupled to an array of beam formers BF1 . . . BFN and the individual signals of each beam former being supplied to receivers RC1 . . . RC-M.

Figure 8:
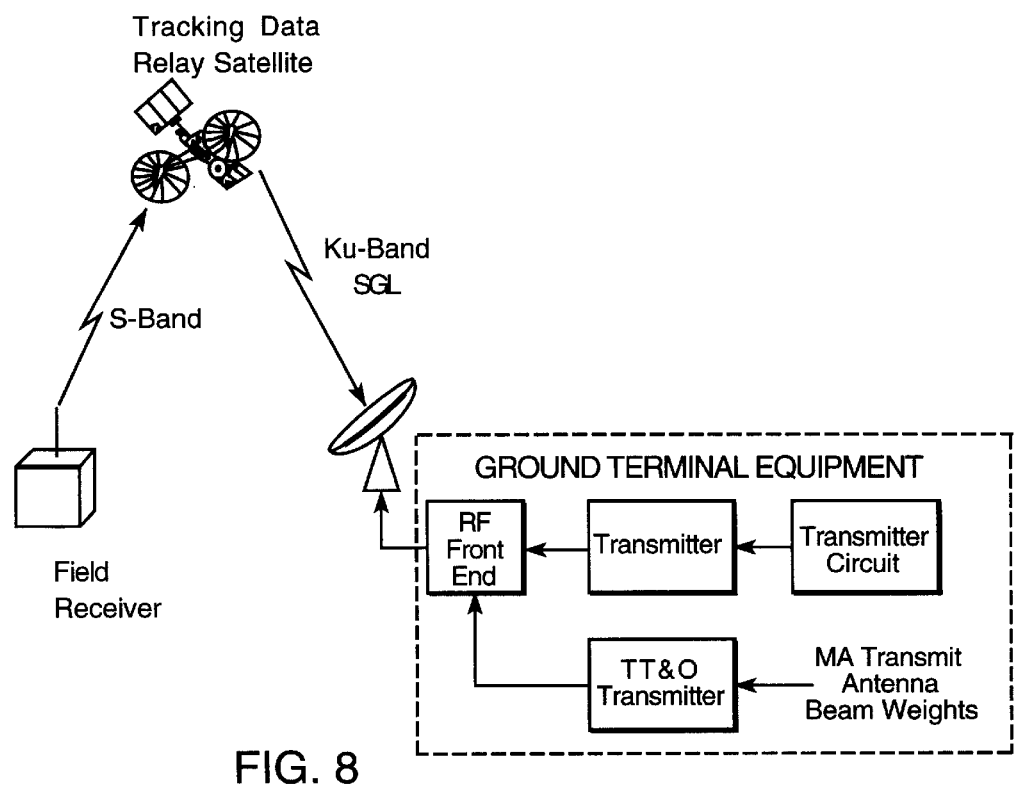
FIG. 8 is a block diagram of the S-band MA forward link.

FIG. 8 is a block diagram of the S-band multiple access forward link illustrating a ground terminal having a command transmitter CT having inputted thereto the MA transmit antenna-beam weight for transmission to the satellite via the Ku-band signal and data for upconversion to a Ku-band signal for transmission via the satellite TDRSS on S-band link to a field receiver.

Figure 9:
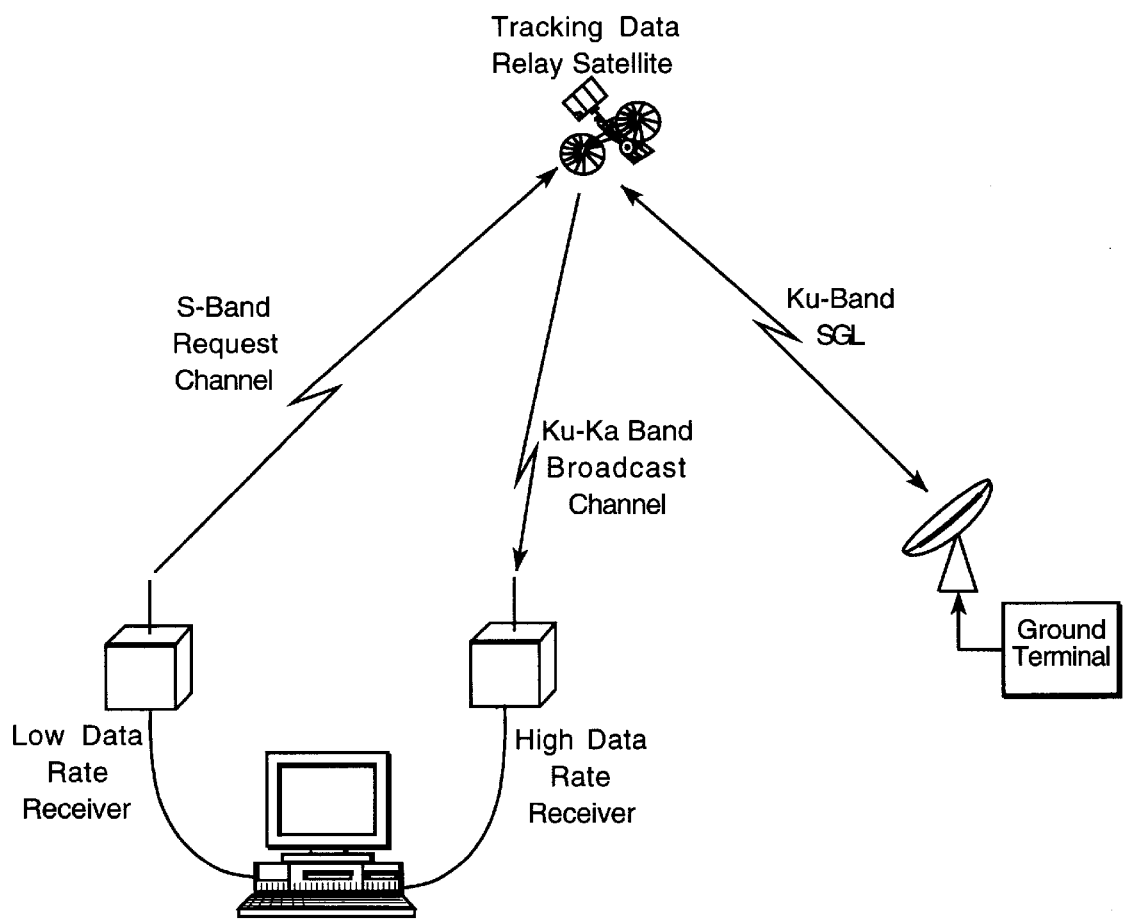
FIG. 9 is a block diagram showing the tracking data rely satellite used in a Global Broadcast (or similar) System.

FIG. 9 illustrates use of the invention for a global broadcast in which a data or information request issued by computer CD is forwarded on a low data rate channel which includes S-band request channel to satellite TDRSS. The data request is forwarded by satellite TDRSS on the Ku-band signal to a ground terminal which stimulates a response which is forwarded, in this case, on the Ku-band uplink. The satellite then beams the response to a broadband high data rate receiver which is coupled to computer CD.

It should be understood that the functions of the field transceiver are not limited to those described specifically, but may include signalling from remote radar, navigation, sensors and controls, encoded voice transmissions, emergency alarms and other applications.

The invention provides unique satellite communication applications via unique utilization of the multi-access (MA) (and in some cases the single-access (SA)) capability of NASA's Tracking and Data Relay Satellite System (TDRSS) or similar satellite communication systems. This capability of the invention is termed "efficient satellite communication (SATCOM) provider" or "ESP". The invention, in its preferred embodiment, would:

1. "Overlay" ESP signals on existing TDRSS signals in the same MA bandwidth or time share the bandwidth for MA and/or services.

2. Largely be independent of, or of manageable impact on, normal of NASA TDRSS operations.

3. Be mutually non-interfering.

4. Permit global random access communications over the MA field-to-hub link.

5. Permit dramatic reductions in field-user effective isotropic radiated power (EIRP) relative to existing geostationary satellites, such as INMARSAT.

6. Apply new, advanced signal processing to enable rapid acquisition (for reduced overhead) high-performance, very low power consumption, and hand-held field unit implementation.

Unique features of the preferred embodiment of the invention include the following:

1. The return (inbound) communications link (from field-to-hub ground terminal) capability is achieved via unique utilization of the TDRSS MA ground-based phase array beamforming capability. In particular, the invention involves augmenting the existing NASA ground beamformers with separate beamformers, of sufficient quantity and independent of NASA operations. This ground beamforming approach, which is not available via any other satellite system in the world, is the key to permitting independent operations and permitting continuous global coverage. An example is use of this application as a random access channels for passing information requests in support of a Global Broadcast System. Operations of this nature are unique to this invention.

2. By employing a sufficient number of independent ground beamformers, per TDRSS satellite, the ESP inbound link is continuously available to ground (including air and sea) users in the field, at all global locations except at extreme latitudes. Specifically, this inbound link supports random access inbound transmissions at any time and anywhere, and is totally independent of normal NASA operations. In addition, multiple receivers/demodulators may be attached to each beamformer to handle multiple independent users within a beam.

3. The ESP inbound beamforming capability also provides the unique, simultaneous capability of global coverage and very low field-user Effective Isotropic Radiated Power (EIRP); such a capability is not available via any other existing or planned satellite system. In particular, the global coverage is provided by the 26 degree beamwidth of each MA element on-board each TDRSS; this broad beamwidth is typical of "earth coverage" geostationary satellite antennas, such as INMARSAT. What is unique here is that the ground beamforming coherently combines the signals from 30 TDRSS antenna elements to yield approximately 14 dB G/T gain, thereby effectively reducing the user's required EIRP by 14 dB relative to conventional satellites. This can provide a battery lifetime for TDRSS user equipment that is substantially longer than a comparable design for an INMARSAT-type system. Furthermore, because the beamforming is performed on the ground, numerous independent beams can be formed on the ground, thereby yielding the desired, simultaneous global coverage and high G/T.

4. The invention's inbound communications can support many ESP users simultaneously without mutual interference. In addition, ESP operation can also occur simultaneously with ongoing, normal TDRSS operations via the same TDRSS MA antenna over the same operating bandwidth. In other words, ESP MA communications can "overlay" on TDRSS communications without mutual interference. This is accomplished by a combination of direct sequence code division multiple access (DS-CDMA) and the ground beamforming capability. Specifically, the ground beamforming capability provides spatial discrimination via its above-described ability to form many spot beams. In addition, ESP and TDRS users employ CDMA with distinct PN codes to generate additional levels of discrimination via processing gains approaching 30 dB for data rates of particular interest (preferably on the order of a few kilobits per second (kbps)). Higher data rates (e.g., up to 150 kbps) can also be used with CDMA but with correspondingly reduced processing gain. Furthermore, within this CDMA framework, the above-described ground beamforming reduces the field user's EIRP well below the CDMA noise floor, thereby further reducing interference levels. In fact, communication link analysis indicates that 40–50 simultaneous CDMA users can transmit within a ground-formed beamwidth and increase the effective noise floor by no more than 0.25 dB. Note that other forms of spread spectrum signalling is possible if deemed acceptable to TDRSS.

5. The above robustness to mutual interference, which is based on the combination of spatial and signal diversity, can be further enhanced by suitable use of packet communications that introduces the additional dimension of time diversity. Precise timing can be accomplished by integrating a GPS receiver with the field unit, using the forward link for loop closure, or other means. The use of rapid acquisition technology in conjunction with spread spectrum signalling offers the means to resolve packet collisions which may occur if a precise timing base is not used.

6. An important element of the ESP inbound ground receiver is the demodulator/detector that interfaces with each beamformer. This element can incorporate advanced charge coupled device (CCD) and DSP technology to permit extremely rapid acquisition, high performance tracking/detection, PN code and data rate programmability, and overall low implementation loss. This element, and the associated signal processing algorithms, are disclosed in Weinberg et al. U.S. Pat. No. 5,126,682, assigned to the assignee hereof.

7. The nominal ESP mode of operations indicated above is inbound operations, which can be totally independent of TDRSS operations. When inbound operations must be supplemented by outbound (hub-to-field) communications—e.g., to support certain emergencies, such as search and rescue—coordination with NASA must take place in order to schedule transmissions to the field via the TDRSS MA phased array or S/K-band SA services. Alternatively, outbound communications can take place via any other satellite system (e.g, INMARSAT, DirecPC, GBS), if desired. TDRSS MA service, however, has a distinct advantage to the field user in certain applications given the high EIRP it provides ($\geq 34$ dBW), relative to Satellites such as INMARSAT.

8. To support outbound, spread-spectrum communications via TDRSS, a unique receiver concept is employed that permits dramatic reductions in power consumption, while simultaneously permitting PN data rate programmability, rapid acquisition and high performance tracking/detection. In a preferred embodiment, the receiver employs a unique combination of open-loop IF sampling, sign-bit detection (no A/D conversion), PN code matched filtering (PNMF) in a long correlator that does not require any multiplications, and all carrier, PN, and symbol synchronization in post-detection software. The nature of the receiver processor readily lends itself to ASIC miniaturization, and hence to hand-held implementation. An advanced CCD correlator implementation may also be used in place of the single bit detector/PNMF.

9. In a preferred embodiment, the receiver field unit could also incorporate a commercially available miniature GPS receiver. The GPS receiver's position output may be relayed back to the hub via the field unit transmitter. Data collected by the field unit's receiver may be used to provide the GPS receiver with almanac, ephemeris, differential GPS and configuration information.

10. The system is a digital communication system that affords tremendous flexibility. The hub and field transceiver may be fitted with a wide range of industrial and custom interfaces of data, voice, imaging, multimedia and other types of information transfer. For example: RS-232, RS-422, IEEE-488, Local Area Networks, telephone and fiber optic interfaces are all feasible as well as all types of protocols (e.g., TCP-IP).

11. This system is well suited for use in mobile applications requiring navigation and tracking. GPS, Loran, dead reckoning, beacon, inertial navigation and radar systems may be used. In addition, the field transceiver may be integrated with the electronic systems of cars, boats, ships, and aircraft to access health and status information about the vehicle, to support/direct its operation, and to operate as part of the information system employed by operators and passengers.

12. A wide range of alarms and sensors may be interfaced with the field and hub communication systems. The system can convey command and status information. These include, but are not limited to, theft/break-in alarms, environmental monitors, emergency/distress indicators, medical monitors and personal security systems.

13. This system is well suited for fleet management, collision avoidance, pager, packet, data transfer, digital voice, data, modem/fax, imaging, multimedia, navigation/tracking (e.g. personal, vehicular and wildlife) applications and global connectivity of classrooms, hospitals, etc.to support international/interactive education, treatment, etc.

14. The hub and field communication units may be interfaced with telephones, mobile telephones, printers, recorders, encryptor/decryptor, modems, computers, navigation/tracking equipment, vocoders and sensors/alarms to support a wide range of applications. The TDRSS acts as a bent pipe system and permits use of all information security means employable via one- and two-way SATCOM channels.

15. Transmit power levels from the field unit for a select data rate is significantly lower with TDRSS than with other existing geosynchronous systems. This aspect results in more efficient use of battery power and reduced exposure to RF emissions.

16. The beamforming capability of the MA forward and return links permit selective beamforming. Said beamforming may include beamsplitting, selective nulling, etc.

17. The single access services of TDRSS may also be employed either in conjunction with or separate from the MA services to support global communications. Excess SA service may be used without impact to normal NASA missions by scheduling unused time or by other forms of signal overlays acceptable to NASA. Unused time may be used by entities operating in a store-and-forward mode.

As noted above, the most significant feature of the MA system is its ground-based antenna beamforming capability that simultaneously yields earth coverage, and up to 14 dB of G/T enhancement relative to conventional earth coverage geostationary satellite antennas. The CDMA nature of the MA system also permits efficient spectrum utilization, and precludes interference impacts on normal user spacecraft MA operations even if a large number (e.g. 50) of low-power, non-NASA users are simultaneously transmitting.

As shown above, the field transceiver integrates a TDRSS transmitter/receiver for communications, and an optional GPS receiver that provides accurate estimate of field user position and time. The noncoherent nature of the TDRSS transmitter/receiver, coupled with the application of digital Application Specific Integrated Circuits (ASIC's) yields compactness and an anticipated low receiver power consumption of less than about 3 watts. Furthermore, the MA G/T enhancement permits up to 1.2–2.4 kbps return link support via ~1 watt of RF transmitter output power and a near-omni antenna. In addition, the GPS receiver can be an off-the-shelf item that is miniature in size (~2" square) and consumes less than 1 watt of power.

Communications requirements of various U.S. Government agencies, as well as non-government groups, is increasingly emphasizing the need for satellite-based, global communications between a hand-held "field" transceiver and a central government hub. These requirements are also emphasizing the need for instantaneous communications on demand, and the utilization of spread-spectrum signalling for low-probability-of-intercept/low-probability-of-detection (LPI/LPD). Several examples are:

1. DoD Combat Survivor Emergency Location (CSEL)—a global search and rescue capability for downed aircraft pilots, that requires the instantaneous availability of a communications link from pilot-to-hub, followed by a rapid response from hub-to-pilot.

2. Special operations of the Department of Justice.

3. Portable, global communications by the Department of Transportation.

4. Department of Interior—monitoring and rescue of researchers/hikers in remote areas.

5. NOAA—science data collection from distributed science stations and associated global interconnectivity of student centers.

The CSEL Program has received particularly significant attention over the past few years, and has led to extensive DoD studies and assessments on potential modifications to DSCS and GPS satellites needed to accommodate nearinstantaneous, global communications. Interestingly, these DoD efforts have attracted the interests of diverse U.S. agencies, such as Justice, Energy and Agriculture, all of which are intensely interested in global communications on demand via hand-held or other types of miniaturized transceivers.

It is within this framework that the TDRSS is emerging as a truly unique national asset, with features and capabilities not available in any other U.S. or foreign satellite system, commercial or military. Specifically, application of the existing TDRSS Multi-Access (MA) system under the invention can provide the global communications on demand, described above, via a compact, very-low-power transceiver. Such an MA/hand-held transceiver application, would cost-effectively offer a broad range of U.S. government users—and non-government users—unique and important services not currently available, without impacting the fundamental TDRSS mission of supporting low orbiting NASA spacecraft. This MA application could also offer a platform in the sky" for technology development towards enhancing U.S. international competitiveness. Furthermore, because the existing constellation of TDRSS satellites are applicable, these new services can start becoming available within the next few years, based on ground system upgrades only—again a feature that cannot be provided by any other satellite system.

Successful ESP operations depends on the continuous availability of two-way satellite communications, with particular emphasis on the ability of a compact field unit to transmit to the hub on-demand—i.e., a return link at any time from virtually anywhere on earth. The uniqueness of TDRSS MA utilization is based on this fundamental requirement, coupled with the diversity of several other requirements that the ESP capability should, preferably, satisfy:

1. Each satellite must provide continuous return link earth coverage, without service scheduling, while simultaneously providing a high G/T. This fundamental feature clearly includes the conflicting requirements of broad antenna coverage and high antenna gain. TDRSS is the only existing satellite system that can satisfy these conflicting requirements because of its 30 element MA phased array antenna, coupled with its unique return link ground beamforming capability. Each element of the satellite array provides full earth coverage, while the ground beamforming can provide a G/T enhancement on the order of 14 dB. Thus, since any desired number of simultaneous beams can be formed on the ground, given a sufficient number of ground beamformers, the ability exists for TDRSS to uniquely provide continuous global coverage, while simultaneously providing the field transmitter a G/T advantage of more than 10 dB relative to a conventional earth coverage satellite antenna. As addressed further below, this introduces the potential for return link compressed voice (1.2–2.4 kbps) via a field transmitter power on the order of 1 watt.

2. No interference impact on normal communication traffic over the satellite. This is clearly a critical system feature. It is satisfied by the TDRSS MA system, which was designed to intentionally support many simultaneous Code Division Multiple Access (CDMA) signals without mutual interference.

3. No dedicated satellite transponder bandwidth required. This is a highly desirable feature, since some of the ESP services (e.g., search and rescue; special operations communications) may be active only a fraction of each day. TDRSS does not have to dedicate bandwidth to ESP because the MA system, which employs CDMA, always operates over its full channel bandwidth, and as noted above, many simultaneous users can operate over this bandwidth without mutual interference.

4. LPI/LPD capability. The CDMA spread spectrum utilization of the MA system inherently provides LPI/LPD. In fact, for 2.4 kbps data or compressed voice, the MA spread spectrum capability provides more than 30 dB of processing gain. Furthermore, the high G/T provided by the ground beamforming permits more than a 10 dB reduction in user EIRP, relative to a satellite with an earth coverage antenna; this EIRP reduction provides an additional degree of LPI/LPD not available via other satellite systems.

5. Global coverage to ground users (except at extreme latitudes). The TDRSS, with its existing three-slot constellation provides global coverage.

6. Availability of a forward link—from Hub to field. This is an essential ESP feature, with the nature of the forward link data a function of the application (e.g., acknowledgement to the downed pilot of Hub receipt of emergency transmission). The TDRSS MA system certainly has this capability, but in contrast to the MA return link the forward link must be scheduled. Given the electronic steering of the MA system, however, antenna pointing in the desired direction can be done very rapidly. In the event of an emergency, such an MA forward link can certainly be established within a few minutes, and probably much less. Accurate position location information would be provided to TDRSS via GPS-derived position data included in the MA return transmission. The SA (said K-band) could also be scheduled to provide forward link service if needed.

A global architectural overview is shown in FIG. 1, which illustrates the three TDRSS nodes, its ground terminals (GT's), and the availability of GPS signals to globally distributed users. The following observations apply:

1. Users are shown as people with hand-held transceivers. More generally, as shown in FIG. 6 and discussed earlier, there is nothing to preclude the users from being instruments (e.g, science or other data collection stations).

2. The user will typically initiate transmission in a purely random access mode. Unique PN codes will be allocated to such users to ensure non-interference with normal TDRSS users. The duration and duty cycle of a transmission represents a subject for further study, but packet transmissions should maximize capacity and minimize the amount of hardware required at the TDRSS GT. Many such transmission can occur simultaneously (e.g., 50) with negligible impact on normal TDRSS user spacecraft communications.

3. Each TDRSS GT is augmented with a sufficient number of beamformers to permit continuous, global coverage. The number of beamformers per GT is currently under investigation, but updated analysis to date indicates the need for 30–40 beamformers per GT. An option may be to apply fewer (e.g. 10–20) fixed beamformers with "defocused", lower-gain beams for initial signal acquisition, and a few separate scanning beams that can provide the maximum MA gain after signal acquisition. The crucial point here, however, is that the TDRSS MA system offers the capability and flexibility to support a variety of operational approaches. Multiple receivers/demodulators may also be connected to each beamformer to increase flexibility by accommodating many simultaneous users per beam.

4. One or more low-cost, multi-channel, rapid-acquisition receiver is connected to each fixed beamformer; rapid acquisition is important in order to minimize transmission overhead, thereby reducing transmission time and enhancing LPI/LPD performance. Each channel is matched to a distinct PN code (e.g., Code 1 for Department of Justice, Code 2 for Search and Rescue, Code 3 for Department of Agriculture, etc.). The low-cost, rapid-acquisition attributes arise directly from proven NASA Advanced Systems Program developments, coupled with the use of fixed, low-data rates. FIG. 3, discussed earlier, illustrates the GT beamforming/receiver concept.

Upon signal acquisition and detection, the TDRSS GT forwards the data to the appropriate end-user destination. End-user coordination with NASA takes place as necessary to schedule the MA forward link (or possibly other SA services) for transmission to the field user. For emergency or other critical scenarios the access to the MA forward link can be extremely rapid (e.g., a few minutes or less). Specific priority arrangements would be included in the Memorandum of Agreement (MOA) between NASA or its representative and the respective user agency or its representative. It should also be noted that a current NASA Advanced Systems Program study is investigating Demand Access utilization of the MA forward service, which would ensure rapid access without scheduling.

Because size and power consumption must be kept to a minimum, while high-performance must still be achieved, the transceiver reflects the following:

1. The TDRSS portion includes a transmitter and receiver that are noncoherent. The absence of coherent turnaround operation greatly simplifies frequency synthesis, which lends itself to simplicity, robustness and significant reductions in power consumption. For the ground-based application of interest here, the absence of coherent turnaround is of little consequence, since it offers virtually no tracking benefit; furthermore, position location and accurate time is accomplished via GPS utilization.

2. The typical TDRSS S-band antenna is assumed here to be a small patch antenna with the approximate dimensions of 3"×3"×0.5". This antenna provides a boresight gain of ~6.5 dB and a 3 dB beamwidth of 80 degrees, thereby yielding attractive gain with little pointing complexity. Furthermore, the RF front end (transmit and receive) can be placed very close to the antenna, thereby minimizing transmit losses and enabling an attractive receiver G/T (e.g., ~−25 dB/° K.). This yields advantages to the current ground-based application which may not be readily applicable to user spacecraft. Other antenna types, based on mission requirements, are also acceptable.

3. The high-performance of the TDRSS receiver (rapid acquisition, low implementation loss) arises from an innovative, all digital design concept, that applies signal processing approaches that have been developed, demonstrated, and continue to be refined, via the NASA Advanced Systems Program. In addition, the design relies on extensive use of Application Specific Integrated circuits (ASIC's) to enable dramatic reductions in size and power consumption. Furthermore, the design concept takes advantage of the higher G/T as discussed earlier.

4. The TDRS transmitter outputs a PN coded signal using a Mode 2 (noncoherent) TDRSS PN code. The output RF power is on the order of 1 watt which, based on link budget analysis, yields an in-bound link data rate 1.2–2.4 kbps. This is a truly profound capability for a hand-held unit transmitting to a geostationary satellite, and clearly reflects the benefit of MA ground-beamforming.

5. The GPS receiver is a self-contained, miniature card residing in the transceiver, that processes the GPS C/A codes and yields position accuracy of 1 km ($3\sigma$) or better. It should be emphasized that 5 to 12-channel GPS receivers are available now, with dimensions no greater than 2"×3", and power consumption less than 1 watt. This thus represents a non-developmental item that is amenable to purchase and direct incorporation into the proposed transceiver.

The invention provides an innovative global satellite communications concept—that takes advantage of the unique properties of the TDRSS MA system to enable global, random access communications via compact, low-power field transceivers. The most significant feature of the MA system is its ground-based antenna beamforming capability that simultaneously yields global coverage and up to 14 dB of G/T enhancement relative to conventional earth coverage geostationary satellite antennas.

The CDMA nature of the MA system also permits efficient spectrum utilization, and precludes interference impacts on normal user spacecraft MA operations even if a large number (e.g., 50) of low-power non-NASA users are simultaneously transmitting. This invention has also presented an operations-concept overview and a description of the critical field transceiver. In particular, it was shown that the field transceiver includes a TDRSS transmitter/receiver for communications, and a GPS receiver that provides accurate field user position. The noncoherent nature of the TDRSS transmitter/receiver, coupled with the application of digital ASIC's and NASA Advanced Systems Technology insertion, yields compactness and an anticipated receiver power consumption of less than 3 watts. Furthermore, the MA G/T enhancement permits 1.2–2.4 kbps in-bound link support via ~1 watt of RF transmitter output power. In addition, the GPS receiver is an off-the-shelf item that is miniature in size and consumes less than 1 watt of power.

The uniqueness of the TDRSS MA capability introduces many diverse applications, to a variety of government agencies, that have not been feasible to date via compact, low-power field transceivers. Examples include: global search and rescue; special operations support; periodic receipt of science data from unmanned, remote science stations, global educational interconnectivity, telemedicine and global broadcasting. In addition, the TDRSS global, random-access capability may introduce new possibilities for mobile communication concept/technology development and testing, and other developments and experimentation, all of which may support U.S. industry in enhancing its international competitiveness. What is especially significant here is that the TDRSS is an existing space asset, that is immediately available without modification, and permits application of a real (rather than simulated) satellite communication channel.

It will be understood that the invention has been described in terms of preferred embodiments, and that modifications and adaptations may be made therein without department from the true scope and spirit of the invention as defined by the following claims.

What is claimed is:

1. In a tracking and data relay satellite system having a satellite communication system that derives satellite antenna pointing/nulling through a linear, weighted combination of multiple signals at a ground terminal, and wherein the signals are derived from an array of broad-coverage antenna elements on one or more earth orbiting satellites having a space-to-ground link with a composite downlink signal composed of the signals from the elements, the improvement wherein the beams formed on the ground for the return link and on the satellite for the forward link are structured so as to null one or more regions within their field of view.

2. In a tracking and data relay satellite system having a satellite communication system that derives satellite antenna pointing/nulling through a linear, weighted combination of multiple signals at a ground terminal, and wherein the signals are derived from an array of broad-coverage antenna elements on one or more earth orbiting satellites having a space-to-ground link with a composite downlink signal composed of the signals from the elements, the improvement for providing additional communications, comprising bidirectional packet data transfer, using altered ground terminal receiver and a related field transceiver, using waveforms, scheduling, beamforming to prevent interference with communications functions of said satellite system, and using acquisition technology to permit reception of short duration packets.

3. In a tracking and data relay satellite system having a satellite communication system that derives satellite antenna pointing/nulling through a linear, weighted combination of multiple signals at a ground terminal, and wherein the signals are derived from an array of broad-coverage antenna elements on one or more earth orbiting satellites having a space-to-ground link with a composite downlink signal composed of the signals from the elements, said satellite system having other communications resources including single access S-, Ku- and future Ka-bands, the improvement for providing additional communication, comprising means providing alternative or augmented services which do not conflict with normal mission communications; conflict-free service augmentation by selective allocation of service resources and/or use of unscheduled service time when no normal mission communication is using the service; use of such unscheduled service selectively through a store-and-forward approach in which the user or ground terminals collects and stores information until such time as service is available; once service is available, the information is transmitted in whole or in part depending on the amount of service available; additional conflict-free service augmentation selectively through allocation of unused frequency on a single-access antenna, for independent user in field-of-view.

4. In a tracking and data relay satellite system having a satellite communication system that derives satellite antenna pointing/nulling through a linear, weighted combination of multiple signals at a ground terminal, and wherein the signals are derived from an array of broad-coverage antenna elements on one or more earth orbiting satellites having a space-to-ground link with a composite downlink signal composed of the signals from the elements, the improvement for providing additional communication, comprising a Global Broadcast System (GBS), implementation means for said GBS including high bandwidth selected from Ku- or Ka-band, and selected S-band component services enable information broadcast from the ground terminals to the field user transceiver; a return link service means; and means enabling field user requests for information to be made via said return link service means.

* * * * *